United States Patent [19]

Shelton

[11] Patent Number: 4,474,402
[45] Date of Patent: Oct. 2, 1984

[54] SELF-ADJUSTING WEATHERSTRIP

[75] Inventor: Alan J. Shelton, Rochester, Mich.

[73] Assignee: General Motors Corporation, Detroit, Mich.

[21] Appl. No.: 491,738

[22] Filed: May 5, 1983

[51] Int. Cl.³ .................. B62D 25/00; E06B 7/23
[52] U.S. Cl. ..................... 296/76; 49/485; 49/498; 49/491
[58] Field of Search ............. 296/76, 93; 49/497, 49/485, 490, 498, 489, 495, 488, 493, 491; 52/716, 717, 718

[56] References Cited

U.S. PATENT DOCUMENTS

| | | | |
|---|---|---|---|
| 2,899,721 | 8/1959 | Herman | 49/497 |
| 2,952,053 | 9/1960 | Freshe | 49/489 |
| 3,388,502 | 6/1968 | Ceyer et al. | 49/498 |
| 3,665,646 | 5/1972 | Niemanns | 49/490 |
| 3,927,493 | 12/1975 | Tsuneishi | 49/485 |
| 4,123,100 | 10/1978 | Ellis | 49/490 |
| 4,143,497 | 3/1979 | Offenbacher | 49/490 |
| 4,343,504 | 8/1982 | Tomioka et al. | 296/76 |

Primary Examiner—Robert R. Song
Attorney, Agent, or Firm—Charles E. Leahy

[57] ABSTRACT

A compressible weatherstrip includes a mounting portion adapted for attachment on the vehicle body and a tubular deflection portion integrally molded with the mounting portion and having a sealing face adapted for engagement by the closure panel upon movement of the closure panel to the closed position. A feeler portion is integrally molded with the tubular deflection portion and is adapted to engage with a flange of the body panel defining the vehicle body opening and deflect the tubular body portion to an adjusted angular orientation so that the sealing face is automatically adjusted to a certain vertical position irrespective of a variation in the vertical position of the weatherstrip mounting portion. Accordingly, the sealing face is reliably poised at a precisely adjusted position which will provide a consistently reliable magnitude of weatherstrip compression upon closure of the closure panel.

2 Claims, 2 Drawing Figures

SELF-ADJUSTING WEATHERSTRIP

The invention relates to a weatherstrip for sealing a closure panel opening in a vehicle body and more particularly provides a weather strip which is automatically adjusted to accommodate dimensional variations between the closure panel and the vehicle body panel upon which the weatherstrip is mounted.

BACKGROUND OF THE INVENTION

It is customary in motor vehicle body constructions to employ a weatherstrip for sealing around a vehicle body opening which is closed by a hingedly mounted closure panel.

For example, the vehicle body may have a luggage compartment opening defined by a flange structure provided on the body panels. The luggage compartment opening is closed by a deck lid which is mounted on the vehicle body by hinges. A compressible weatherstrip is mounted on the vehicle body. When the deck lid is closed, the deck lid engages with the weatherstrip and compresses a tubular deflection portion of the weatherstrip to provide a water tight seal between the closure panel and the vehicle body.

The aforedescribed weatherstrips are conventionally extruded of a soft elastomeric material and include a mounting portion such as an extruded channel which receives an edge portion of a vehicle body panel to mount tubular deflection portion of the weatherstrip within the opening for engagement by the closure panel. Variation in the dimension of the edge portion of the vehicle body panel and/or variation in the degree to which an assembly operator seats the weatherstrip mounting portion on the body panel edge portion result in a variation in the position at which the weatherstrip is mounted on the vehicle body. In order to assure a water tight seal irrespective of such variation in the mounting position of the weatherstrip, it is well known to design the weatherstrip with a tubular deflection portion which is intentionaly oversized to assure that the deflection portion will be forcibly engaged and compressed by the closure panel when the closure panel is closed.

A disadvantage of oversizing the tubular deflection portion of the weatherstrip to compensate for the mounting variation is that the force necessary to close the closure panel is increased because of the need to compress the additional height intentionally built into the deflection portion of the weather strip. Furthermore, there may be variation from vehicle to vehicle in how much force must be employed to close the closure panel.

The aforedescribed challenge of assuring a water tight seal between a closure panel and vehicle body is further complicated in vehicle bodies where the weatherstrip mounting portion is mounted on a vehicle body panel separate from the body panel which defines the body opening. For example, some vehicles of modern manufacture have an underlying self-supporting body structure upon which plastic panels are mounted to define the outer body surface and the luggage compartment opening therein. The method and application for such a plastic door panel attachment is disclosed in copending patent application Ser. No. 418,200, filed Sept. 15, 1982 by Wieslaw Zaydel and assigned to the assignee of this invention. The plastic panels are mounted on the underlying self-supporting body structure by dimensionally oversized attaching blocks which are machined to a precise height so that each plastic body panel is located for precise meeting with adjacent body panels. The luggage compartment in such a vehicle body is defined by a separate metal or plastic luggage compartment panel which is suitably attached to the self-supporting body structure. The luggage compartment panel has an edge portion which receives the weatherstrip mounting portion to mount the tubular deflection portion of the weatherstrip for engagement by the closure panel so that the weatherstrip effectively prevents intrusion of moisture into the passenger compartment.

Because the mounted location of the plastic body panels and the closure panel will vary with respect to the location of the luggage compartment panel upon which the weatherstrip mounting portion is mounted, it would be desirable to provide a new and improved weatherstrip which would assure a water tight seal irrespective of the location of the mounting portion of the weatherstrip with respect to the closure panel.

More particularly, it would be desirable to provide a weather strip structure which would automatically adjust relative to the closure panel irrespective of a variation in the vertical position of the mounting portion of the weatherstrip so that the deflection portion of the weatherstrip would be consistently poised at a precisely adjusted position providing a consistently reliable magnitude of weatherstrip compression.

SUMMARY OF THE INVENTION

According to the invention, a compressible weatherstrip includes a mounting portion adapted for attachment on the vehicle body and a tubular deflection portion integrally molded with the mounting portion and having a sealing face adapted for engagement by the closure panel upon movement of the closure panel to the closed position. A feeler portion is integrally molded with the tubular deflection portion and is adapted to engage with a flange of the body panel defining the vehicle body opening and deflect the tubular body portion to an adjusted angular orientation relative to the mounting portion of the weather strip so that the sealing face is automatically adjusted to a certain vertical position irrespective of a variation in the vertical position in the weatherstrip mounting portion. Accordingly, the sealing face is reliably poised at a precisely adjusted position which will provide a consistently reliable magnitude of weatherstrip compression upon closure of the closure panel.

DESCRIPTION OF THE DRAWINGS

These and other objects, features and advantages of the invention will become apparent upon consideration of the specification and the appended drawings in which.

DESCRIPTION OF THE PREFERRED EMBODIMENT

Figure 1:
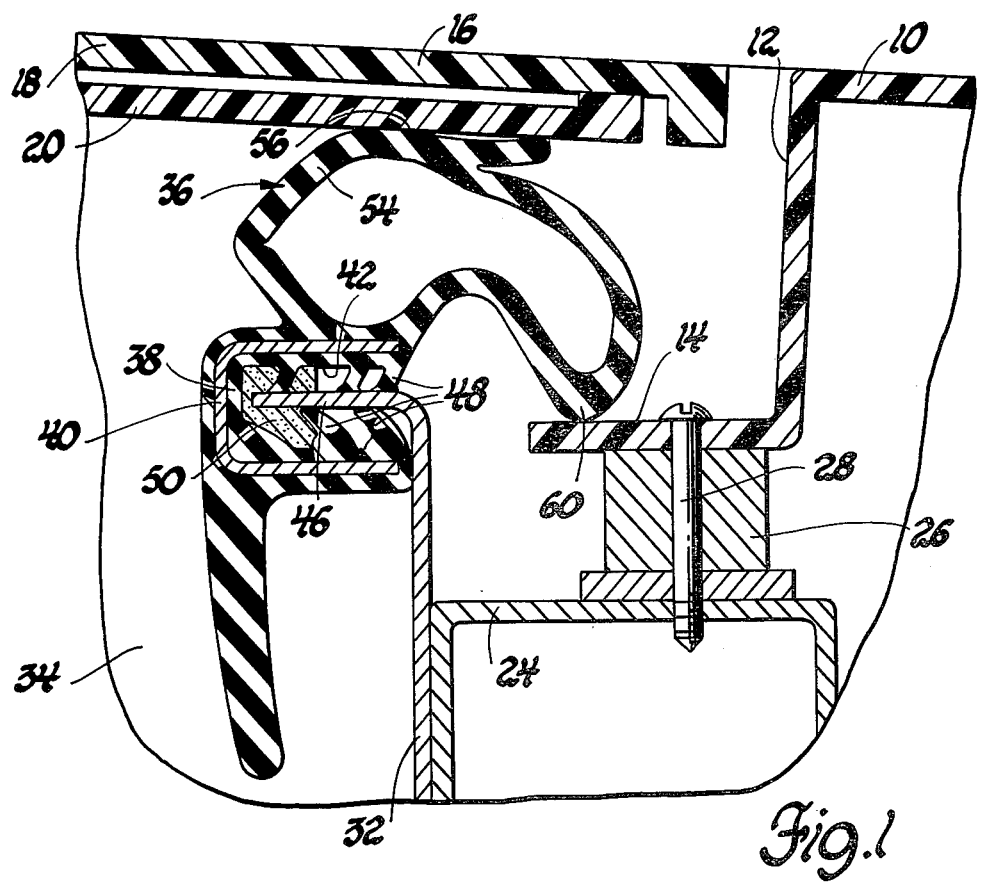
FIG. 1 is a sectional view of an automobile closure structure embodying the weatherstrip of this invention and showing closure panel in the closed position.
Figure 2:
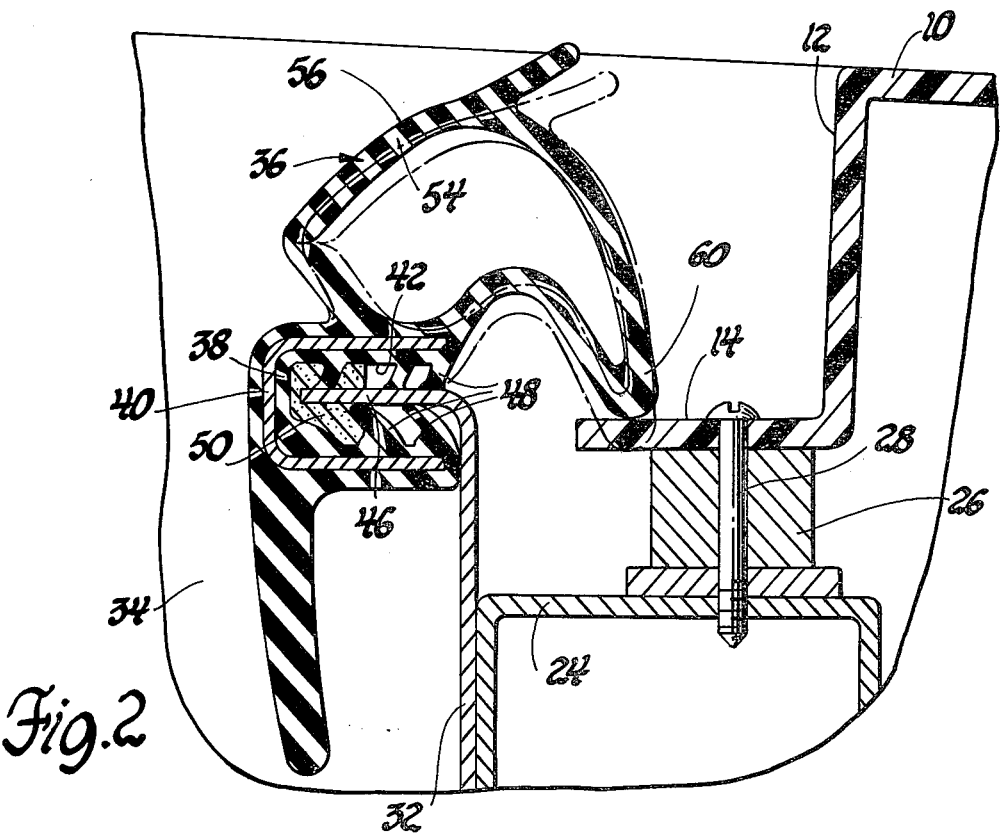
FIG. 2 is a view similar to FIG. 1 but showing the closure panel open so that the weatherstrip is shown poised for compression when the closure panel is again closed and also having a phantom line representation of the weatherstrip in its free molded state prior to having been mounted on the vehicle body.

Referring to FIGS. 1 and 2 there is shown a vehicle body structure including a body panel 10 which defines a vehicle body opening 12. The vehicle body panel 10 has an inwardly offset flange structure 14.

A closure panel 16, such as a deck lid, is comprised of an outer panel 18 and an inner panel 20. The closure panel 16 is supported within the opening 12 by hinge structure provided at one end of the closure panel 16 and a latch provided at the other end of the closure panel 16. The hinge and the latch function to mount the closure panel 16 in a closed position flush with the body panel 10 as shown in FIG. 1. When the latch is unlatched, the closure panel 16 may be pivoted about the hinge to an open position in which the closure panel 16 is removed from the opening 12 as shown in FIG. 2.

Referring to FIG. 1, it is seen that the flange 14 of the quarter panel 10 is mounted upon the underlying self-supporting body structure 24 of the vehicle body by an attaching block 26 and a screw 28. Attaching block 26 is machined during the process of assembling the vehicle so as to establish the vertical height of the body panel 10 at an elevation which mates with adjacent body panels. Reference may be had to U.S. patent application Ser. No. 418,200, filed Sept. 15, 1982 by Wieslaw Zaydel for a further description of such a vehicle body power attachment.

A luggage compartment accessible through the body opening 12 is defined by a compartment panel 32. The compartment panel 32 is attached to the body structure 24 in a suitable manner not shown.

A weatherstrip 36 is provided to prevent the entry of moisture into the luggage compartment 34. The weatherstrip 36 is extruded of a soft low density elastomeric material and includes a mounting portion 38 having a metallic reinforcing channel 40 embedded therein. The mounting portion 38 has a recess 42 continuous therealong for receiving an inwardly bent flange 46 in the edge portion of the compartment panel 32 by which the mounting portion 38 is mounted on the compartment panel 32. A plurality of flexible fingers 48 of the mounting portion 38 extend into the recess and resiliently contact with the flange 46. A bead of butyl mastic or other sealant 50 situated at the bottom of recess 42 seals and adhesively secures the interface between the mounting portion 38 and the flange 46.

The weatherstrip 36 also includes a tubular deflection portion 54 which is extruded integrally with the mounting portion 38 and has a sealing face 56 which is adapted to be engaged by the closure panel 16 and forcibly compressed thereby to form a water tight seal therebetween. As shown in FIG. 2, the tubular portion 54 of the weatherstrip 36 has a height at which the sealing face 56 is poised at an elevated position within the opening 12 for engagement by the closure panel 16 upon movement of the closure panel 16 to the closed position.

As best seen in FIG. 2, it will be understood that the height of the sealing face 56 within the opening 12 is determinative of the degree of compressive interference between the closure panel 16 and the weatherstrip 36. In order to automatically adjust the height of the sealing face 56, the weatherstrip is provided with a feeler portion 60 which is extruded integrally with the tubular deflection portion 54 and is adapted to engage with the flange 14 of the body panel 10 upon attachment of the mounting portion 38 on the flange 46 of the compartment panel 32.

Referring to FIG. 2, the phantom line indicated position of the weatherstrip 36 shows the natural undeflected position of the weatherstrip 36 prior to its being mounted on the vehicle body. Accordingly, as seen in FIG. 2, the insertion of the weather strip mounting portion 38 onto the flange 46 causes the feeler portion 60 to engage with the flange 14 of the body panel 10 and thereby deflect the tubular deflection portion 54 to an adjusted angular orientation in which the sealing face 56 is raised to a higher elevation within the vehicle body opening 12. If the body panel 10 were to have been mounted at a higher elevation relative to the flange 46, the tubular deflection portion 54 will have been rotated to an even higher elevation than shown in FIG. 2 by the contact of the feeler portion 60 with the flange 14. On the other hand, if the body panel flange 14 were to have been mounted at a lower elevation relative to the flange 46, the feeler portion 60 will cause a lesser upward deflection of, tubular deflection portion 54. Thus, the feeler portion 60 serves to extend into contact with the flange 14 of the body panel 10 and automatically adjust the tubular deflection portion 54 of the weatherstrip 36 to an adjusted height establishing the sealing face 56 at a certain vertical position within the opening 12 irrespective of variation in the vertical position of the mounting portion 38. Accordingly, when the closure panel 16 is closed, the sealing face 56 will be engaged and compressed to assure a moisture tight sealing interference therebetween and yet without necessitating an excessive amount of compression of the tubular deflection portion 54 which would result in a greater than desired effort to close the closure panel 16.

Thus it is seen that the invention provides a new and improved weatherstrip arrangement for sealing around the vehicle body opening and more particularly provides a weatherstrip having a feeler portion associated with the tubular deflection portion to automatically adjust the deflection portion to a certain vertical position poised for a consistently reliable magnitude of compression by the closure panel to provide an effective water tight seal and consistently reliable closing effort.

While the invention has been disclosed primarily in terms of the specific embodiment shown in the drawings, it is not intended to be limited thereto but only to the extent set forth in the appended claims. For example, the invention is described herein as applying to a motor vehicle luggage compartment enclosed by deck lid. However, the compressible weather strip arrangement of this invention may be similarly employed in connection with a vehicle door, an engine compartment or other vehicle opening. Furthermore, the vehicle panels may be of plastic or metallic construction and the self-adjusting weatherstrip may be employed in vehicle body constructions other than shown herein.

The embodiments of the invention in which an exclusive property or privilege is claimed are defined as follows:

1. A compressible weatherstrip for mounting on a vehicle body to seal a gap around a vehicle body opening defined by a body panel flange and selectively closable by a movable closure panel comprising:

a mounting portion adapted for attachment on the vehicle body;

a tubular deflection portion integral with the mounting portion and having a sealing face adapted for engagement by the closure panel upon movement to the closed position so that the tubular deflection portion is forcibly compressed and bears upon the closure panel to seal against the entry of moisture therebetween; and a feeler portion integral with the tubular deflection portion and adapted to engage with the flange of the body panel upon attachment of the mounting portion on the vehicle body and concomitantly deflection the tubular body portion relative to the mounting portion whereby the sealing face is automatically adjusted into a certain vertical position irrespective of a variation in the vertical position of the mounting portion so that the sealing face is poised at a precisely adjusted position which provides a consistently reliable magnitude of weatherstrip compression.

2. In a motor vehicle body having a compartment defined by a vehicle compartment panel and accessible through the flanged opening in a body panel and closable by a hinged body panel, a compressible weatherstrip for compressive sealing engagement between the compartment panel and the closure panel comprising:

a mounting portion having a recess adapted to receive the edge portion of the compartment panel to mount the mounting portion on the compartment panel;

a tubular deflection portion integrally molded with the mounting portion and adapted for engagement by the closure panel upon movement of the closure panel to the position closing the opening so that the tubular deflection portion is forcibly compressed and bears upon the closure panel to seal against the entry of moisture therebetween; and a feeler portion integral with the tubular deflection portion and adapted to interfere with the flange of the body panel in a manner to effect a bodily deflection of the tubular deflection portion upon mounting of the mounting portion of the weatherstrip onto the edge portion of the compartment panel so that the tubular portion is deflected to a position in which the deflection portion is poised at a precise location for establishing a predeterminedly consistent degree of compressive engagement by the closure panel to seal the interface between the compartment panel and closure panel and provide a predetermined degree of closing effort.

* * * * *